United States Patent Office 3,519,413
Patented July 7, 1970

3,519,413
STABLE HIGH-ANALYSIS SUSPENSION-TYPE FERTILIZERS
Honore Trimbach, Grand'Couronne, and Alexandre Villard, Saint Etienne-du-Rouvray, France, assignors to Potasse et Engrais Chimiques, Paris, France
No Drawing. Filed July 16, 1965, Ser. No. 472,652
Claims priority, application France, July 24, 1964, 982,903
Int. Cl. C05b 11/16
U.S. Cl. 71—42                 5 Claims

ABSTRACT OF THE DISCLOSURE

For the production of aqueous fluid suspensions of crystalline fertilizers, which suspensions are stabled for at least one month without any substantial increase in crystal growth or viscosity of the suspension, a gum such as guar or locust bean flour is admixed to the suspension in a concentration of preferably 0.3–0.4% by weight of the total suspension, and wherein the suspended solids have a particle size distribution of 90% being of 0.1–1 millimeter and 50% being 0.5–1 mm.

---

This invention relates to high-analysis fertilizers in fluid form and to a method for preparing such fertilizers.

It is known that the preparation of fertilizers in the form of solutions presents several advantages compared with the usual manufacture of solid fertilizers. In particular, the preparation of fertilizer solutions avoids granulating and drying steps, thereby eliminating the additional investment and operating costs associated with large heavy equipment and the extensive land or building area required for both housing the equipment and providing the necessary surge and storage capacity for the intermediate and final products. In addition, the other drawbacks of solid fertilizers such as caking or dust formation are avoided by the use of liquid fertilizers since they can be more easily and uniformly applied to the soil.

On the other hand, however, a serious disadvantage of liquid fertilizer resides in the limited solubility of the various nutrients, thereby making it difficult to obtain highly concentrated products. The transportation of fertilizer solutions is thus more expensive than that of solid fertilizers since, for a determined quantity of plant nutrients, a large amount of water must be handled.

To cope with this drawback it has been proposed to manufacture fertilizers in the form of aqueous suspensions having a plant nutrient content substantially higher than that of solutions, but nevertheless presenting the same advantages as fertilizer solutions when compared to solid fertilizers, that is the elimination of the granulating and drying steps on the one hand, and the improvement in the distribution of the fertilizer to the soil, on the other hand.

In order to obtain fertilizer suspensions which are stable during storage (i.e. do not settle), it has been proposed to add to the aqueous suspensions of plant nutrients, swelling clays such as attapulgite, bentonite or mixtures thereof, e.g. U.S. Pats. 3,109,729 and 3,096,170. The latter products are effective when used in sufficient quantity (in practice, at least 1 to 2% by weight of suspension), but they have the disadvantage of being relatively expensive and of consequently increasing the cost of fertilizer suspensions significantly.

A principal object of this invention, therefore, is to provide inexpensive fertilizer suspensions which are stable during storage.

Another object is to provide a process for the production of such inexpensive stable suspensions.

Still another object is to provide novel compositions which are obtained as intermediate materials in the process of this invention.

Upon further study of the specification and appended claims, other objects and advantages of this invention will become apparent.

To attain the objects of this invention it has been discovered that the addition of a very small quantity of a hydrophilic gum imparts a high stabilizing activity to a fertilizer suspension.

The hydrophilic gums which can be used according to this invention comprise in particular natural vegetable gums coming from exudations of trees and shrubs such as gum arabic, tragacanth or the like, mucilages extracted from certain seeds such as gum guar, locust bean gum etc. They comprise also, synthetic gums obtained by various chemical processes from wood and cotton cellulose etc. such as methyl cellulose and carboxymethyl cellulose. In the following description the word "gum" is used to designate any one of the products belonging to the different classes mentioned hereabove.

The most preferred gums are guar gum and locust bean gum. Suitable gums which are somewhat more expensive are as follows: flours of other leguminous plants, e.g. soybean, clover, etc.; alginates, gelatin, pectin, dextrin, and starch. Still other gums include those mentioned in "The Water-Soluble Gums," Mantell, Reinhold, New York (1947), and in other literature.

A very small quantity of gum is sufficient to obtain suspensions which remain stable even after long periods of storage, e.g. at least 30 days, and at widely variable temperatures. In any case, it is unnecessary for this quantity to exceed 0.5% by weight of total suspension, for a quantity of gum higher than 0.5% does not substantially improve the suspension of the solids, and, in many instances, tends to increase the viscosity of the suspension exceessively.

The optimum proportion of gum to be added varies with the type of fertilizer manufactured. With certain formulations, particularly those with less than about 5% $K_2O$, a gum quantity of 0.1% by weight of suspension is sufficient to give satisfactory results. With $K_2O$ in higher concentrations, the best results are obtained with 0.3–0.4% of the gum by weight of suspension—higher quantities of gum being required for higher quantities of $K_2O$.

At this juncture, it is to be pointed out that the use of guar gum has been proposed as a gelatin agent in U.S. Pat. 3,105,754 to retard the solubility of solid water-soluble nitrogen-containing fertilizer. This is accomplished by admixing a melt of a solid water-soluble nitrogen-containing fertilizer with the gelation agent and solidifying the resultant mixture.

This use and method of incorporation of guar gum is thus quite different from its use and method of incorporation in the present invention. Furthermore, the minimum concentration of guar gum in the patent corresponds to about twice the preferred maximum amount of guar gum, on a total solids basis, as that which is to be used in the present invention. Obviously, then, this patent does not in any way suggest the use of guar gum as a stabilizing agent for fertilizer suspensions, much less does it hint at the fact that unexpectedly low concentrations of gum are both technically feasible and economically desirable. Still further, whereas the very purpose of the addition of the gelation agent in the patent is to retard the water-solubility of the nitrogen-containing fertilizer, the addition of guar in the present invention does not affect the fertilizer water-solubility in any way whatsoever.

In order that the suspensions can be easily applied to the soil and, in particular, be sprayed with no risk of clogging the apparatus, the solids in suspension must be in the form of finely divided particles. In practice, the particle size must not substantially exceed 1 mm. On the other hand, it is preferred that the suspension does not contain extremely small crystals in order to avoid a deleterious increase in the viscosity of the suspension. A suspension containing a given weight of crystals is more viscous the smaller the particle size. Particularly good results are obtained when 50% of the solids has a particle size ranging from 0.5 to 1 mm., 90% of the solids having a particle size ranging from 0.1 to 1 mm., and the remaining 10% being lower than 0.1 mm.

Substantially all the usual fertilizer compounds containing one or more of the primary plant nutrients, i.e., nitrogen, phosphorus, and potassium, can be used in the form of a suspension. Among the nitrogen compounds more usually employed are: ammonium nitrate, ammonium sulfate, and ammonium phosphates, potassium nitrate, urea and mixtures thereof. For the manufacture of fertilizers containing phosphorus, ammonium phosphates are preferred, but potassium phosphates and/or calcium phosphates can also be utilized. The addition of potassium is made in the form of salts such as, for example, potassium chloride, sulfate, nitrate, phosphates, carbonate and/or bicarbonate. All of these fertilizers are conventionally analyzed on the basis of nitrogen, phosphate, and potash, and referred to as compounds of the latter moieties.

The suspensions of the present invention can be prepared in cooperation with conventional processes for the production of mixed solid fertilizer. For example, using the pasty reaction mixture obtained during the preparation of fertilizers such as nitrophosphates, in which mixture the solid compounds are in finely divided form, the paste is taken before the drying step and if necessary adjusted to the desired fluidity by addition of water.

More specifically, suspensions can be prepared from a paste obtained by the attack of phosphate rock with nitric acid followed by ammoniation of the reaction mixture in order to precipitate dicalcium phosphate. An addition of other nitrogen compounds such as ammonium nitrate, urea etc. and/or other inorganic acids (sulfuric or phosphoric acid) and/or potassium salts can be made so as to obtain the desired fertilizer formula.

The economy realized by this technique, as compared to the cost of solid fertilizers, results not only from the elimination of the granulating and drying steps, but also from a significant saving in the consumption of the acid (or acids) usually used for the conversion of calcium nitrate into a less hygroscopic salt such as calcium sulfate, phosphate or carbonate. This saving is gained by the fact that the presence of calcium nitrate, undesirable in solid fertilizers owing to its hygroscopicity and its caking tendency in the products containing it, is obviously not deleterious in fertilizer suspensions. Therefore, it is possible to make use of an existing plant producing solid mixed fertilizers for the preparation of fertilizer suspensions according to the method described above, which represents a very practical and advantageous consideration.

According to another method for preparing fertilizer suspensions of the present invention, an aqueous solution of phosphoric acid, nitric acid or a mixture thereof is neutralized with gaseous or liquid ammonia, or an aqueous ammoniacal solution containing optionally ammonium nitrate and/or urea. The introduction of the reactants is adjusted so that the pH value of the reaction mixture remains between about 5 and 8 during the ammoniation. Moreover, the pH value of the end product is preferably close to neutral in order to mitigate corrosion problems; the final pH value is, therefore, preferably adjusted to about 6.5–7.5. Preferably, the temperature of the reaction mixture must not exceed about 100° C. and, as the heat evolved by the neutralization of the acids tends to increase its temperature, the reaction mixture must generally be cooled in an industrial operation. It is particularly suitable to operate between 60 and 100° C., the preferred range being about 75–80° C.

The neutralization of the acid (or acids) can be effected in any type of apparatus provided with a sufficiently strong stirring device to obtain a precipitate of the ammonium salt having crystals preferably lower than 1 mm. in size. According to the fertilizer formula desired, other fertilizer compounds in solid form such as urea or potassium salts can be added to the suspension of ammonium salts obtained, these solid compounds being ground to a granular size not exceeding 1 mm.

The gum can be added directly to the suspension of precipitated fertilizer salts before or after the addition of other fertilizer compounds introduced in solid form. Under these conditions, a strong agitation of the mixture is necessary so that the gum is very rapidly and uniformly distributed and to avoid the formation of lumps. Once the mixture is homogeneous one can continue a mild stirring during a period long enough to obtain a suitable thickening of the suspension.

Accordingly to another method, the gum is first mixed with a small quantity of a non-aqueous water-miscible organic liquid in which the gum does not swell but is dispersed in fine particle sizes. The liquid mixture is then added to the suspension of precipitated fertilizer salts, along with optional amounts of added solid fertilizer compounds. Examples of such water-miscible organic liquids are alkanols of 1–3 carbon atoms, particularly methanol, and also lower ketones, such as acetone.

In a preferred method, the gum is premixed with one of the solid compounds to be added to the suspension of precipitated fertilizer salts and in this case a mild agitation is sufficient to obtain a homogeneous mixture and secure a good distribution of the gum.

Concentrated fertilizers of many types, that is to say having a high plant nutrient content and in which the relative proportions of these nutrients vary to a very large extent, can be prepared in the form of suspensions by using the methods described herein above. Among the numerous types of three plant nutrient fertilizers which can be prepared according to the present invention, fertilizers having the following nutrient ratio are exemplified, 1–1–1, 1–1–2, 1–1–3, 1–2–1, 1–2–2, 1–2–3, etc. When these fertilizers are prepared from phosphoric acid, they have an overall content of plant nutrients of at least 39% and, in most cases, their nutrient content is comprised between about 40 and 45%. When the suspensions are prepared from phosphate rock, their concentration is slightly lower owing to the presence of calcium salt in the final fertilizer: however their overall plant nutrient content can reach and even exceed 35%, and the economy realized by using phosphate rock instead of phosphoric acid for their manufacture more than offsets the small reduction in concentration. In the case of fertilizers containing two plant nutrients, having for example 1–0–1 and 1–1–0 nutrient ratio, the total plant nutrient content is generally comprised between about 30 and 40%. The minimum practical concentration of fertilizer suspension is about 30%.

In general, however, a fertilizer suspension (also called slurry fertilizers) can be defined as containing at least one fertilizer compound (a plant nutrient) in solution and in chemical equilibrium with its suspended solid.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Unless otherwise indicated, all parts and percentages are on a weight basis.

EXAMPLE 1

Into a reaction vessel equipped with a stirring device and containing 45 parts of water were simultaneously introduced by means of feeding tubes, gaseous ammonia and a mixture of nitric acid and phosphoric acid containing 29.8% $P_2O_5$ and .22% $HNO_3$. This mixture of acids was prepared in a separate vessel from wet-process phosphoric acid containing 50% $P_2O_5$ and technical grade nitric acid containing 55% $HNO_3$.

The flow rate of the mixture of acids into the reaction vessel was adjusted to maintain the pH of the mixture close to 6.5 during the entire ammoniation process, while the temperature was maintained between 75 and 80° C. 503 parts of the mixture of acids and 91 parts of ammonia were used for this operation at the end of which the pH value was adjusted at 6.7.

110 parts of urea containing 46% N and having a particle size ranging between 0.1 and 1 mm., with 50% of the particles having a size between 0.6 and 1 mm., were then added under agitation. To the resultant suspension which then has a temperature of 25° C. was added a previously prepared mixture of 250 parts of potassium chloride containing 60% $K_2O$ and having a particle size between 0.1 and 1 mm., and 3 parts of commercial grade guar flour. After introduction of this mixture, the suspension was maintained under mild agitation for 2 hours to allow the guar gum to swell.

A 15–15–15 fertilizer was obtained having a viscosity of 550 centipoises at 20° C. After standing for 3 months at outdoor temperture, a sample of this suspension had a viscosity of 520 centipoises at 20° C., did not show any noticeable settling and could be sprayed readily. After 9 months outdoor storage (from September to June), another sample of the same suspension had a viscosity of 250 centipoises. A very slight settling was observed, but a suitable suspension of the solids was obtained quite easily by mild stirring, for example by air bubbling.

Another sample of this suspension was submitted to successive heating-cooling cycles in order to observe the behavior of the crystals. Each cycle comprised maintaining the product at 40° C. for 10 hours then at ambient temperature (from 15 to 20° C.) for 14 hours.

The initial particle size of the product was as follows:

Particles having a size higher than 0.70 mm.: 1.6%
Particles having a size higher than 1 mm.: 0%

After 4 heating-cooling cycles the two fractions were the same as above (1.6 and 0%) and after 9 cycles these fractions were respectively 2.0 and 0%. After 9 months outdoor storage, the fraction of particles higher than 1 mm. was only 0.2%. The growth of the crystals in the suspension was, therefore, very small.

EXAMPLE 2

In a reaction vessel equipped with a stirring device and containing 115 parts of water were simultaneously introduced gaseous ammonia and a mixture of nitric acid and phosphoric acid containing 42.7% $P_2O_5$ and 8% $HNO_3$.

The flow rate of the introduction of the mixture of acids was adjusted to maintain the pH value between 6 and 6.5 and the temperature at a approximately 80° C. After adding 421 parts of the mixture of acids and 82 parts of ammonia, the pH value was adjusted to 6.8.

4 parts of commercial grade locust bean flour were dispersed in the hot mixture under strong agitation and then left to swell for 1 hour under mild agitation. 32 parts of urea containing 46% N, then 300 parts of 60% $K_2O$ potassium chloride were added to the cooled mixture, these two products having been ground so that all the particles have a size not exceeding 1 mm.

A 9–18–18 fertilizer was obtained having a viscosity of 595 centipoises at 20° C.

EXAMPLE 3

In a plant for the manufacture of solid mixed fertilizers, a suspension was prepared as follows:

90 parts of Morocco phosphate rock containing 33.4% $P_2O_5$ were reacted with 726 parts of nitric acid containing 55% $HNO_3$ at a temperature of about 70° C. After 25 minutes, the reaction was completed, and into the resultant mixture were simultaneously introduced phosphoric acid (50% $P_2O_5$) and gaseous ammonia. After addition of 90 parts of phosphoric acid and 127 parts of ammonia, a suspension having a final pH value of 6 was obtained.

A mixture was prepared containing 130 parts of 60% $K_2O$ potassium chloride having a particle size less than 1 mm. and 3 parts of guar flour. This mixture was added to the suspension and maintained under mild agitation for 1 hour. A 20.2–7.5–7.8 fertilizer was thereby obtained which was easily pumped and sprayed. After standing for 3 weeks, the suspension was still easy to pump and spray.

The preceding examples can be repeated with similar success by substituting the generically and specifically described reactants and operating conditions of this inventoin for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process of preparing a fertilizer in the form of an aqueous suspension, which process comprises ammoniating a concentrated aqueous solution of a plant nutrient selected from the group consisting of phosphoric acid, nitric acid, and mixtures thereof, at 60–100° C. while maintaining a pH of 5–8, and under sufficient agitation to precipitate ammonium salts, 90% having a particle size of 0.1–1 mm. and 50% of 0.5–1 mm.; and adding a hydrophilic gum selected from the group consisting of guar and locust bean flour to the resultant suspension in an amount sufficient to maintain said ammonium salts in suspension for a prolonged period, said amount being not more than 0.5% by weight of the total weight of the suspension, this step being conducted while the suspension is agitated sufficiently to distribute said gum rapidly and uniformly.

2. A process as defined by claim 1 wherein said fertilizer includes potash in an amount to yield a concentration of $K_2O$ higher than 5% and said gum is present in a concentration of about 0.3–0.4% by weight of the total weight of the suspension.

3. A process as defined by claim 1 wherein said hydrophilic gum is added while dispersed in a water-miscible organic liquid which does not swell said gum.

4. A fertilizer produced by the process of claim 1.

5. A fertilizer produced by the process of claim 2.

References Cited

UNITED STATES PATENTS

| | | | |
|---|---|---|---|
| 1,843,420 | 2/1932 | Gunther et al. | 252—352 |
| 3,096,168 | 7/1963 | Waters et al. | 71—28 |
| 3,234,005 | 2/1966 | Smalter et al. | 71—29 |

OTHER REFERENCES

Bancroft, Wilder D., Applied Colloid Chemistry, 2nd. ed., McGraw-Hill Book Co. Inc., New York, 1926, pp. 77 and 203.

Mantell, C. L., The Water Soluble Gums, pp. 124 and 126–127, Reinhold Publishing Co. N.Y., 1947.

HOWARD R. CAINE, Primary Examiner

U.S. Cl. X.R.

71—64; 252—352

UNITED STATES PATENT OFFICE
CERTIFICATE OF CORRECTION

Patent No. 3,519,413                    Dated July 7, 1970

Inventor(s) Honore Trimbach and Alexandre Villard

It is certified that error appears in the above-identified patent and that said Letters Patent are hereby corrected as shown below:

Column 2, Line 51, change "gelatin" to ---gelation---

SIGNED AND
SEALED
OCT 13 1970

(SEAL)
Attest:

Edward M. Fletcher, Jr.
Attesting Officer

WILLIAM E. SCHUYLER, JR.
Commissioner of Patents